United States Patent
Billiet et al.

(10) Patent No.: US 6,782,940 B2
(45) Date of Patent: Aug. 31, 2004

(54) METHOD FOR RAPID REPRODUCTION OF MOLDS AND MOLD COMPONENTS

(76) Inventors: Romain L. Billiet, 135A Malacca Street, Penang (MY), 10400; Hanh Thi Nguyen, 135A Malacca Street, Penang (MY), 10400

( * ) Notice: Subject to any disclaimer, the term of this patent is extended or adjusted under 35 U.S.C. 154(b) by 0 days.

(21) Appl. No.: 09/873,879

(22) Filed: May 29, 2001

(65) Prior Publication Data

US 2001/0050155 A1 Dec. 13, 2001

Related U.S. Application Data

(60) Provisional application No. 60/209,858, filed on Jun. 7, 2000.

(51) Int. Cl.$^7$ ............................................... C04B 35/64
(52) U.S. Cl. ............................ 164/6; 264/227; 264/220
(58) Field of Search .............................. 164/6, 12, 253; 264/227, 220

(56) References Cited

U.S. PATENT DOCUMENTS

| | | |
|---|---|---|
| 2,939,199 A | 6/1960 | Strivens |
| 3,709,459 A | 1/1973 | Bushrod |
| 4,139,677 A | 2/1979 | Blair et al. |
| 4,197,118 A | 4/1980 | Wiech |
| 4,220,190 A * | 9/1980 | Horton et al. ................. 164/35 |
| 4,704,079 A | 11/1987 | Pluim |
| 5,199,482 A * | 4/1993 | Ruhle .......................... 164/120 |
| 5,234,655 A * | 8/1993 | Wiech, Jr. .................... 264/227 |
| 5,432,224 A * | 7/1995 | Ryuhgoh et al. ............. 524/439 |
| 5,435,959 A * | 7/1995 | Williamson et al. ........ 264/221 |
| 5,976,457 A | 11/1999 | Amaya et al. |

FOREIGN PATENT DOCUMENTS

JP    1-130838    *  5/1989

* cited by examiner

Primary Examiner—Kiley Stoner
Assistant Examiner—Len Tran
(74) Attorney, Agent, or Firm—Foley and Lardner

(57) ABSTRACT

The invention overcomes prior art problems associated with mass-production of technology-based commercial products like watch cases, mobile telephone housings, medical appliances, etc. such as high investment in tooling, delays in production, short economic tool life, inconsistence and mismatching between parts made in different geographical locations, etc., through the use of standardized, interchangeable ceramic mold inserts.

16 Claims, 2 Drawing Sheets

METHOD FOR RAPID REPRODUCTION OF MOLDS AND MOLD COMPONENTS

CROSS-REFERENCE TO RELATED APPLICATIONS

This application claims priority to U.S. Provisional Patent Application Ser. No. 60/209,858 filed on Jun. 7, 2000.

REFERENCES CITED

U.S. Patent Documents

| | | | |
|---|---|---|---|
| 2,939,199 | Sep. 1960 | Strivens | 264/63 |
| 3,709,459 | Jan. 1973 | Bushrod | 249/134 |
| 4,139,677 | Feb. 1979 | Blair, et al. | 428/409 |
| 4,197,118 | Apr. 1980 | Wiech | 264/63 |
| 4,704,079 | Nov. 1987 | Pluim | 425/190 |
| 5,234,655 | Aug. 1993 | Wiech, Jr. | 264/227 |
| 5,976,457 | Nov. 1999 | Amaya, et al. | 419/36 |

STATEMENT REGARDING FEDERALLY SPONSORED RESEARCH OR DEVELOPMENT

Not Applicable.

REFERENCE TO A MICROFICHE APPENDIX

Not Applicable.

BACKGROUND—FIELD OF INVENTION

The present invention relates to molds. More specifically, the present invention relates to an improved process for the fabrication and reproduction of molds used for the simultaneous mass-production of identical precision parts in different geographical locations.

BACKGROUND—DESCRIPTION OF PRIOR ART

With the exponential growth of technology and the globalization of markets, manufacturers of mass-produced consumer products such as watches, mobile telephones, pagers, handsets, computing, gaming and other electronic devices, etc., are challenged by an increasingly discriminating consumer population expecting innovative, technically advanced and esthetically attractive products incorporating the latest technological developments. As an example of the growth of such items, worldwide annual production of watches has skyrocketed to 1.2 billion pieces in 1999, worldwide personal computer (PC) shipments reached nearly 105 million units in 1998 and are expected to exceed 191 million by 2002, while global shipments of cellular telephones are estimated at over 500 million units for the year 2000 and are expected to reach 1 billion units by 2002.

Such products must be economically mass-produced and comply with increasingly stringent technical and environmental specifications. Accordingly, to remain competitive, manufacturers of mass-produced consumer items must be in a position to rapidly change the design of their products, not just to keep abreast of fast changes in technology, but also to maintain a steady stream of renewed products with increased functionality and enhanced esthetic appeal.

As a result of this state of things, numerous manufacturers of mass-produced consumer products relocate their manufacturing operations offshore in order to benefit from a more attractive manufacturing environment including tax holidays, employer-friendly legislation, lower cost of industrial space, water, utilities, infrastructure, labor, etc. But the conditions prevailing at such offshore locations are never constant, e.g. low labor cost countries may, within the span of a few years, turn into high labor cost countries, or change rapidly and unexpectedly due to political upheaval, culminating in manufacturing operations being curtailed or even outright suspended. To protect themselves from such contingencies and/or to be closer to specific markets, many manufacturers of mass-produced consumer articles often spread out their manufacturing operations over several countries, each having its own specific environment, language, culture, customs, rules, laws, work ethics, etc. Generally, many components of such mass-produced consumer articles are contracted out to local workshops and small businesses such as machining shops, printed circuit board assembly operations, moldmaking and molding shops and the like. In developing countries, the cheapest contractors are often small, family-run operations, unable to understand or adapt fast enough to the fast changing and increasingly sophisticated specifications of technologically advanced products. It is also essential that components made by one contractor in one location can be substituted or matched with components made by another contractor in another location. As is well known, it is virtually impossible to exactly balance and identically match cavities in a single multi-cavity molding tool, let alone in multi-cavity molding tool sets located thousands of miles away from each other.

Mold cavities are normally machined or ground as a set of carbon or copper electrodes for each mold half, and these electrodes are then used to burn a negative or female representation of the parts into the mold insert blocks, a process which is laborious, time consuming and expensive. Adding to the time and cost of fabricating molds is the detail work needed to create internal channels for heating or cooling and the fabrication of ejector pins, ejector holes and slide and wear components. Depending on the complexity and size of the tool, fabrication time can take from six weeks for a simple tool to an average of twenty-four weeks for a larger more complex one.

In addition, injection molding is extremely hard on molds. Various attempts have been made to improve the performance and economic life of molds by utilizing mold inserts or facings on the mold cavity from various materials with better wear resistance. Such attempts include the use of silicon nitride or silicon carbide mold facings as set forth, for example, in Bushrod U.S. Pat. No. 3,709,459 and Blair et al. U.S. Pat. No. 4,139,677. However, such attempts, while offering a solution to the problem of wear, run into problems of misfit and cracking as a result of the difference in the coefficient of thermal expansion between the ceramic facing and the metallic backing or body of the cavity or mold. Pluim U.S. Pat. No. 4,704,079 has attempted to solve these problems by using mold inserts formed by freeze casting particulate silicon metal and reaction bonding the thus formed inserts in nitrogen gas to generate silicon nitride. Amaya et al. U.S. Pat. No. 5,976,457 metal injection mold their mold inserts, which are subsequently machined to fit into the die pockets of multi-cavity tools.

Each of the aforementioned inventions has somewhat reduced the problems of the prior art, yet each has issues that detract from its adoption and neither methods are simple, accurate and cheap to implement. Also, they fail to address the specific issues of cost, wear and dimensional consistency raised by the simultaneous, multi-location mass-production of modern, short-lived consumer products such as watch cases, mobile telephone housings, computer enclosures, and a myriad of other mass-molded products.

Presently, the most common way of producing a watch case is by stamping a blank from of a sheet of stainless steel and machining this blank to its final configuration. Due to the complexity of the finished product, the number of machining steps involved is often large, sometimes well over one hundred, and watch manufacturers do not hesitate to capitalize on this fact in their advertising. Punching dies used for blanking usually have a very short life and may have to be replaced or repaired after as few as 500 punches. As a result of this problem, an increasing number of watch manufacturers have recently turned to plastics, metal, and ceramic injection molding technology for the fabrication of watch components such as cases, bracelet links and buckles. But as watch designs also change rapidly, the investment in tooling and its maintenance quickly becomes unaffordable.

In the case of housings for mobile telephones, the most common method of fabrication is by molding them from either filled or unfilled polymeric materials, which can be done by almost any conventional plastics molding shop. However, many molding shops find it hard to keep up with the rapid pace of change in design and materials and cannot produce the necessary molding tools fast enough. They may then have no other alternative but to raise the costs of tool making because they need more mold makers, additional or more advanced machine tools, measuring equipment, etc. This represents a substantial investment, which few mold making shops can justify. As a result, many molding contractors subcontract some of their work to other shops. All of this contributes to high tooling costs and the virtual impossibility to maintain consistent quality, tight tolerances, and high quality workmanship. To make matters worse, it is well known that mold and toolmakers are in worldwide short supply.

The total investment in tooling for mass-produced consumer items can quickly become prohibitive. For example, in the case of a telephone housing molded in a single-cavity molding tool, the number of parts that can be produced in 6 months is about 400,000–500,000, which corresponds roughly to the commercial life of a molding tool. Since each active tool needs at least one backup tool to avoid downtime—which could result in irreversible loss of market share—50 molding tools would be required to support an annual production of 10 million units, assuming only 2 product design changes per year. At an average cost of $50,000 per molding tool, this represents an annual capital investment expenditure of $2,500,000 for tooling alone.

In today's manufacturing environment, the ability to reduce the time elapsed between the concept of a new consumer product and its availability on the shelves of retailer shops constitutes an often decisive competitive advantage. A further imperative is the application of the so-called 'Just In Time' principle of inventory control to streamline and minimize the time needed for the supply of component parts to manufacturing operations spread out over the globe. Yet another facet of modem marketing strategy is the need to educate or prepare the markets ahead of the introduction of new, often very short-lived consumer products, by launching costly, massive, global advertising campaigns. To be effective, such campaigns must coincide with the simultaneous launch of the advertised product on major world markets and at predetermined times, e.g. to benefit from seasonal surges in sales like during the weeks preceding Christmas.

All the above criteria are virtually impossible to satisfy when manufacturing operations are spread out over different countries and tooling and components are fabricated by a multitude of subcontractors in different locations. The combination of above problems makes it very difficult and costly to maintain dimensional and quality consistency in finished mass-produced products and to react rapidly to changing market conditions.

BRIEF SUMMARY OF THE INVENTION

In accordance with the present invention the problems of the prior art are substantially overcome by providing a speedy, accurate and economical method to duplicate injection molds and mold components through the use of low-cost, standardized, interchangeable ceramic mold inserts.

OBJECTS AND ADVANTAGES

It is the object of this invention to provide a speedy, accurate and economical method to duplicate molds and mold cavities used for the mass-production of injection molded consumer articles through the use of standardized, interchangeable ceramic mold inserts.

It is another object of this invention to provide a method to substantially reduce the investment and maintenance costs for mold tooling and mold components.

It is yet another object of this invention to reduce or eliminate inconsistencies in the dimensions, surface finish or surface texture between parts produced in different molding tool sets and in multi-cavity molds located in different geographical locations.

It is a further object of this invention to provide a method to allow the fabrication of commercial articles that are compatible and interchangeable with each other though being produced in different tool sets or mold cavities.

An additional object of this invention is to allow the molding of parts with more accurate dimensions and tighter dimensional tolerances by the use of standardized ceramic molding tool inserts.

A still further object of this invention is to substantially reduce the wear associated with the continuous operation of molding tools, thereby extending their useful economic life.

In addition, through the application of this invention, it is possible to rapidly change from one product model to another using the same molding tool. Most injection molded mass-produced consumer products or their components involve a generic basic shape, e.g. an oblong, flat elongated box for a mobile telephone housing, a flat round box for a watch case. This inherently predisposes them to benefit from the instant invention since all that needs to be done to convert a tool to a new product design is to change the ceramic mold inserts.

BRIEF DESCRIPTION OF THE SEVERAL VIEWS OF THE DRAWINGS

FIG. 1-*b* illustrates the layout of the mold used to mold said green insert.

FIG. 2-*b*. shows the corresponding final ceramic mold insert after binder removal and sintering of the said green ceramic mold insert, the former being an exact miniature of the latter.

DESCRIPTION OF THE PREFERRED EMBODIMENTS

Figure 1A:
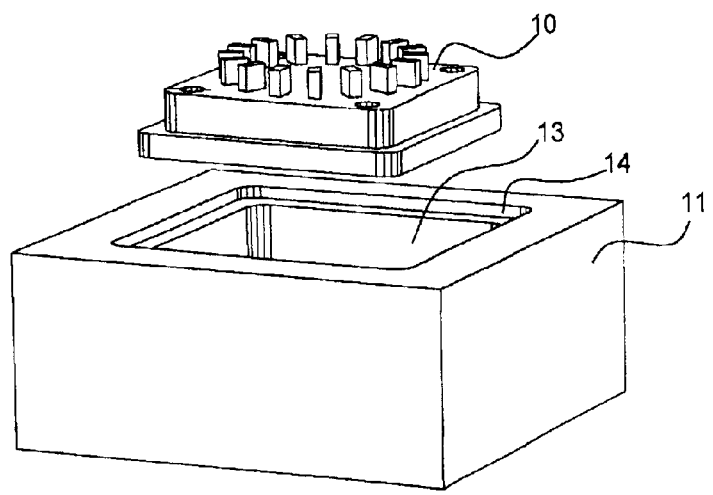
FIG. 1-*a* shows an oversized prototype or model of a moldable portion—or of the entire part if the configuration is moldable in one piece—of the proposed mold insert. Also shown in FIG. 1-*a* is the mold base in which the said oversized prototype insert will be mounted so as to form a cavity that will be used to mold a green insert which will be a negative or mirror image of the original prototype insert part.

At the outset, it should be understood that while the discussion of the specific embodiments of the invention will be provided mainly with reference to aluminum oxide, the invention also applies to other ceramic materials, metals, plastics, and many other materials and combinations of materials that can be made to be moldable.

As in the prior art, the present invention starts with a standard mold base, or master mold, made up of at least two parts, usually termed the cavity and core side, each comprising a mold block portion in which suitable pockets or mounting cavities are milled to receive the ceramic mold cavity inserts. The inner surface of the ceramic mold cavity inserts defines the geometry of the mold cavity when the mold is closed.

In a preferred embodiment of the present invention, an oversized prototype mold for the mold cavity inserts can be produced by so-called 'soft' tooling techniques. Such techniques include the machining of soft metals such as aluminum or copper alloys, etc. Wherever tolerance specifications permit, techniques such as stereolithography, where a computer guided laser beam converts a photosensitive polymer composition into a solid three dimensional part, may also be used. Although such 'soft' tooling is not normally suitable for volume production because it wears out easily, it is highly suitable for the purpose of this invention as only a limited number of ceramic mold inserts, sufficient to equip any active molding tools, are required.

In another preferred embodiment of the present invention, the preferred material for the mold inserts is aluminum oxide or alumina, a very abrasion-resistant material yet substantially cheaper than most other ceramic materials or steel. The preferred shaping technique is by ceramic injection molding.

The molding material employed here typically would be approximately 60% by volume of a fine grain alpha aluminum oxide which has been milled to its ultimate crystal size and 40% by volume of a thermoplastic binder mixture. A typical alumina powder would be a reactive calcined alumina produced by Alcoa and designated as A-16SG with an average particle size of less than 0.5 $\mu$m. A typical formula for the thermoplastic binder mixture would be approximately one third by weight of polyethylene, one third by weight of paraffin wax, one third by weight of beeswax with perhaps 0.1 through 0.2 percent of stearic acid added.

It should be noted here that the soft mold or die required to form the ceramic mold inserts must be scaled up from the dimensions of the final configuration by approximately 20 percent, i.e., the final desired dimensions must be multiplied by approximately 1.2 to determine the mold cavity dimensions. The shrinkage upon sintering however is quite isotropic, so that all dimensions shrink substantially to the same scale factor. The isotropic nature of the shrinkage ensures that angles are maintained substantially constant in the green and fired article. The exact scaling factors involved are dependent upon the specific formulations and processing techniques utilized.

The thermoplastic materials and aluminum oxide are admixed and blended together into a homogeneous mass at a temperature in excess of the melting point or flow point of the thermoplastic materials. Techniques for producing thermoplastic molding mixtures are well described in the prior art and will not be elaborated on here.

The cooled green molding material is crushed to pellet size or otherwise comminuted and constitutes the feed material for a substantially conventional plastics injection molding machine suitably modified to accept abrasive materials.

Figure 1B:
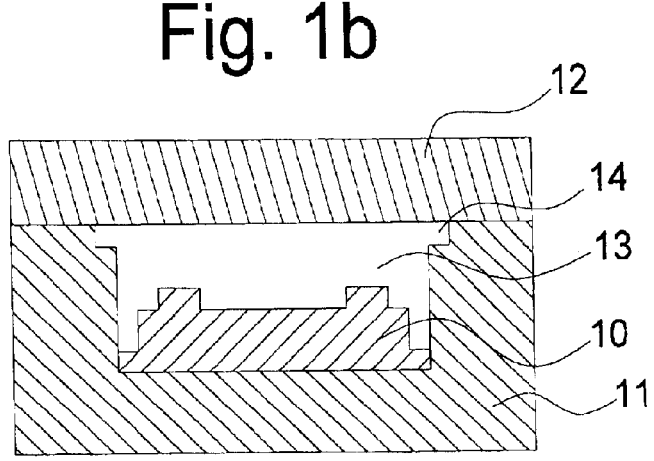

Returning now to FIGS. 1-*a* and 1-*b*, the soft tooling 10 for the ceramic mold inserts is inserted into a suitable cavity 13 of a mold or shell 11–12 which can contain additional desired design features including the three dimensional configuration and surface texture of all surfaces, through and side holes, internal channels for heating or cooling, as well as a standardized mounting surface 14. Hence, when the molding material is injected into this cavity it will generate both the inner and outer surface geometry of the green ceramic mold inserts.

Figure 2A:
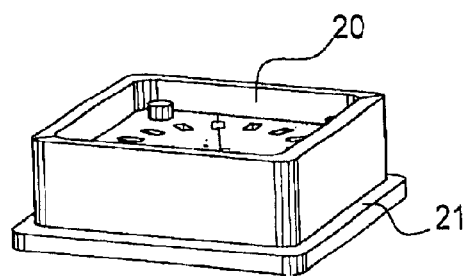
FIG. 2-*a* shows the resulting green ceramic insert molded in the above mentioned cavity.
Figure 2B:
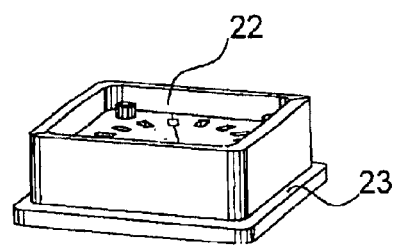

Following molding of the green ceramic mold inserts 20 shown in FIG. 2-*a*, any secondary operations can be performed on them. For instance, vents and gates can be machined into the green ceramic mold inserts if such design features had not already been incorporated in the cavity 13. Upon the performance of any such secondary operations the thermoplastic binder is extracted from the green ceramic mold inserts 20 which are then sintered to their final dense configuration 22 in accordance with prior art techniques as set forth, for example, in Strivens U.S. Pat. No. 2,939,199 and Wiech U.S. Pat. No. 4,197,118. It will be noted that the sintered ceramic mold insert 22 constitutes a faithful miniature of the green counterpart 20.

Figure 3:
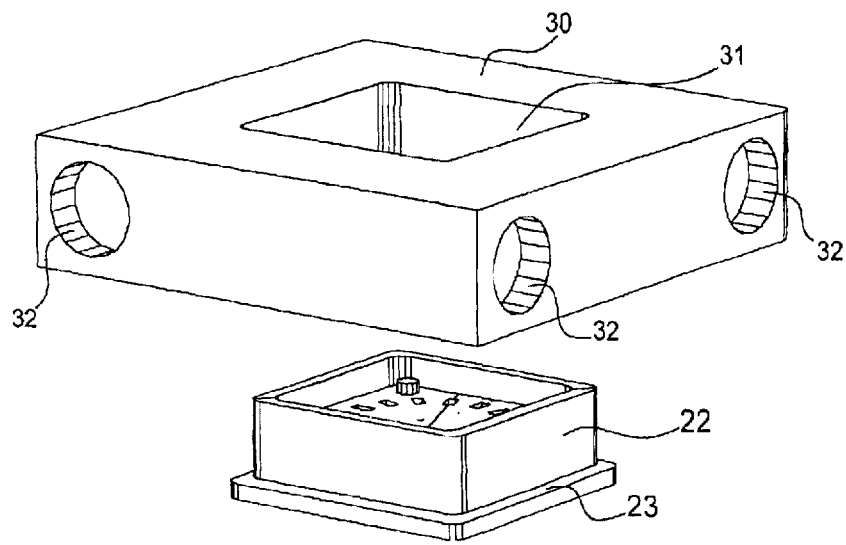
FIG. 3 illustrates the mold die or insert block having a pocket in it to receive the above mentioned sintered ceramic mold insert.

Referring to FIG. 3, the sintered ceramic mold inserts 22 are now ready to be mounted into the milled mounting pockets 31 of the mold die or mold insert block 30 which also incorporates the necessary water lines 32 for cooling the mold. The outer surface geometry of the sintered ceramic mold inserts 22 comprises the aforementioned appropriately designed mounting surface 23 having a standardized geometry so as to allow the inserts to fit into the milled mounting pockets 31 of any master mold or die 30 in such a way that they will be adequately supported and subjected to compressive stress during production molding of the final product. The exact configuration of the mounting surface of the green mold inserts will depend on the particular type of the desired commercial product.

Figure 4:
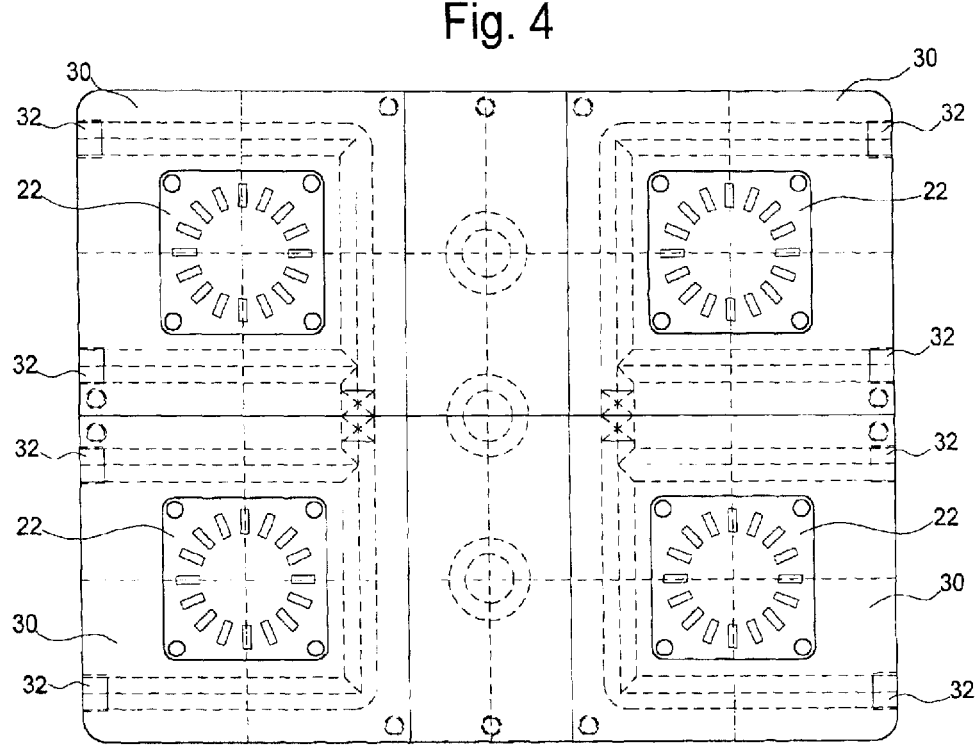
FIG. 4 shows the complete assembled multi-cavity molding die, in which each cavity is fitted with a sintered ceramic mold insert.

As shown in FIG. 4, different mold dies 30, each equipped with a ceramic mold insert 22 are assembled to form a multi-cavity molding die.

There are many ways of securing the ceramic mold inserts so that they will be maintained in a state of compressive stress throughout the molding cycle. One way of securing ceramic inserts in the milled pockets of the mold block is by mechanical wedging. Another method is by providing a set of mounting pins and holes in the mounting surface of the ceramic mold insert with corresponding holes and pins in the milled pockets of the mold block optionally fitted with springloaded fixtures so that the ceramic mold inserts can be readily snapped in the correct place. Yet another method of securing the ceramic mold inserts to the milled pockets of the mold base is through the application of a vacuum. Still another method of securing the ceramic mold inserts to the milled pockets of the mold base is by providing an intermediate mounting plate or frame made from a metallic alloy with a substantially identical or slightly lower coefficient of thermal expansion as that of the ceramic mold inserts. An example of such a metallic alloy is Invar 36 of the Carpenter Corporation which has a coefficient of thermal expansion of about 4.2 $\mu$m/m/° C. whereas alumina of 99.9% purity, such as the kind used for injection molding the ceramic mold inserts the object of this invention, has a coefficient of thermal expansion in the vicinity of 7.4 $\mu$m/m/° C. Hence, at the typical molding temperatures of plastics or metal or ceramic injection molding feedstocks, which usually do not exceed 200° C., the ceramic mold inserts produced in accordance with this invention will be under compressive stress.

The ceramic mold inserts may also be fitted with locating pins and holes to make certain that they will fit properly into the pockets of the mold base. This will ensure consistency between products made in different molding tools with respect to dimensional accuracy, parting line matching, etc. all of which are critical requirements in the molding of mass-produced precision parts.

CONCLUSION, RAMIFICATIONS AND SCOPE

One of the major advantages of this invention resides in the ability to produce ceramic mold inserts to tight dimensional tolerances and with superior surface finish, thereby precluding the need for secondary machining or grinding. This is achieved by controlling two process variables. The first one is the granulometry and morphology of the particulate material used in the molding formulation. The extremely fine aluminum oxide grains of the submicron-sized alumina powder used in this invention yields better surface finish and definition than would be possible when using a coarser particulate material. The second process variable is the volumetric ratio of particulate material to binder in the green molding material. A higher volumetric ratio of particulate material to binder results in a smaller shrinkage and, therefore, improved control over dimensional tolerances. Hence, within the limits afforded by dependent process variables such as the rheology of the green molding material and independent variables such as the specific geometry of the ceramic mold insert, ceramic mold inserts with superior dimensional tolerance and better surface finish can be achieved.

As the ceramic mold inserts fabricated according to this invention are chemically inert and resistant to abrasion by molten metals, plastics and metal or ceramic injection molding feedstocks, they are essentially wear proof and will retain their surface finish indefinitely, thus eliminating the need for periodic mold cavity refurbishing. The greater temperature resistance and low coefficient of thermal expansion of ceramic mold inserts produced according to this invention minimizes thermal distortion or tolerance shifting within the mold, allowing easier production of precision parts. Ceramic mold inserts fabricated in accordance with this invention can be easily and instantly fitted into any active molding tool set, even by non-technical operators as the inserts incorporate a standardized mounting surface.

The combination of net shape capability, superior dimensional accuracy, surface finish and abrasion resistance and low manufacturing cost of ceramic mold inserts produced in accordance with this invention allows substantial savings on tooling costs. Moreover, the thus functionally improved molding tools will produce parts of more accurate and consistent dimensions. In conclusion, the major advantage of this invention resides in rendering possible the simultaneous use of different molding tools to mass-produce identical commercial articles with superior surface finish, improved dimensional accuracy, part to part consistency, and at a fraction of the time and cost than would be achievable by the prior art.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim as our invention:

1. A method for the rapid fabrication and reproduction of molds and mold components comprising:
   a. creating a cavity and core patterns of a mold;
   b. ceramic injection molding a homogeneous dispersion of ceramic powder or powders in an organic binder around each version of the cavity and core pattern to form a corresponding die block part as a green article wherein said ceramic powder or powders of said green article are not sintered;
   c. processing said green article to consolidate the ceramic powder or powders including a means for debinding said binder of said dispersion and forming a sintered ceramic mold;
   d. inserting said ceramic mold into a mold base or master mold insert adapted for use in molding metals, ceramics or plastics.

2. The method of claim 1 wherein the ceramic powder or powders used to produce said ceramic molds are selected from the group of oxides, carbides, nitrides and other ceramic powders that are adapted to be processed to near full density.

3. The method of claim 1 wherein the resulting molds include at least one of coordinate reference points and ejector hole locations.

4. The method of claim 1 wherein the resulting molds are adapted to be incorporated into a mold base used for the die casting of materials.

5. The method of claim 3, wherein the resulting molds include coordinate reference points.

6. The method of claim 3, wherein the resulting molds include ejector hole locations.

7. The method of claim 1 wherein the resulting molds are adapted to be incorporated into a mold base used for the die casting of aluminum materials.

8. The method of claim 1 wherein the resulting molds are adapted to be incorporated into a mold base used for the die casting of zinc materials.

9. The method of claim 1 wherein the homogeneous dispersion of ceramic powder or powders in an organic binder comprises approximately 60% by volume of a fine grain alpha aluminum oxide that has been milled to its ultimate crystal size and approximately 40% by volume of a thermoplastic binder mixture.

10. The method of claim 1 wherein the homogeneous dispersion of ceramic powder or powders in an organic binder comprises approximately 60% by volume of a fine grain alpha aluminum oxide that has been milled to its ultimate crystal size and approximately 40% by volume of a thermoplastic binder mixture, wherein the thermoplastic binder mixture comprises approximately one third by weight of polyethylene, one third by weight of paraffin wax, one third by weight of beeswax.

11. The method of claim 9 wherein the 60% by volume of a fine grain alpha aluminum oxide is a calcined alumina with an average particle size of less than 0.5 microns.

12. The method of claim 1 wherein the cavity and core patterns of the mold created at "a" have dimensions approximately 20% greater than the final dimensions of the die block part.

13. The method of claim 1 wherein processing said green article includes ring.

14. The method of claim 13 wherein processing said green article comprises shrinking said green articles by about 17%.

15. The method of claim 13 wherein processing said green article comprises shrinking the green articles, wherein the shrinkage is isotropic.

16. The method of claim 10, further comprising adding stearic acid to the binder mixture.

* * * * *